US006700132B2

(12) United States Patent
Chuman et al.

(10) Patent No.: US 6,700,132 B2
(45) Date of Patent: Mar. 2, 2004

(54) FLAT PANEL DISPLAY DEVICE UTILIZING ELECTRON EMISSION DEVICES

(75) Inventors: Takashi Chuman, Tsurugashima (JP);
Takamasa Yoshikawa, Tsurugashima (JP); Takuya Hata, Tsurugashima (JP);
Kazuto Sakemura, Tsurugashima (JP);
Takashi Yamada, Tsurugashima (JP);
Nobuyasu Negishi, Tsurugashima (JP);
Shingo Iwasaki, Tsurugashima (JP);
Hideo Satoh, Tsurugashima (JP);
Atsushi Yoshizawa, Tsurugashima (JP);
Kiyohide Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/029,392

(22) Filed: Dec. 28, 2001

(65) Prior Publication Data

US 2002/0125490 A1 Sep. 12, 2002

(30) Foreign Application Priority Data

Dec. 28, 2000 (JP) ........................................ 2000-401723

(51) Int. Cl.$^7$ ........................... H01L 29/06; H01L 29/12
(52) U.S. Cl. ........................ 257/10; 313/495; 313/496;
313/310; 313/497; 313/336; 313/351
(58) Field of Search ................................ 313/495, 496,
313/310, 497, 336, 351; 257/10

(56) References Cited

U.S. PATENT DOCUMENTS

| 5,894,189 | A | * | 4/1999 | Ogasawara et al. | .......... 313/310 |
| 5,936,257 | A | * | 8/1999 | Kununoki et al. | ............ 257/10 |
| 5,962,959 | A | * | 10/1999 | Iwasaki et al. | ............. 313/310 |
| 6,313,572 | B1 | * | 11/2001 | Yamada | ...................... 313/310 |
| 6,414,433 | B1 | * | 7/2002 | Moore | ........................ 313/582 |

* cited by examiner

Primary Examiner—Eddie Lee
Assistant Examiner—Joseph Nguyen
(74) Attorney, Agent, or Firm—Sughrue Mion, PLLC

(57) ABSTRACT

A display device includes a backside and a front-side substrates facing each other with a vacuum space therebetween; and a plurality of electron emission sites provided on the backside substrate. Each electron emission sites includes a bottom electrode formed on a surface of the backside substrate proximate to the vacuum space, an insulator layer formed over the bottom electrode, and a top electrode formed on the insulator layer and arranged individually apart from each other and facing the vacuum space. The display device also includes a plurality of bus electrodes for electrically connecting the neighboring top electrodes; and insulating protective films each provided between the bus electrode and the insulator layer and between the bus electrode and the backside substrate.

9 Claims, 7 Drawing Sheets

- ○ : DEVICE CURRENT IN CONVENTIONAL CONFIGURATION
- □ : EMISSION CURRENT IN CONVENTIONAL CONFIGURATION
- ◇ : DEVICE CURRENT IN EMBODIMENT OF THE INVENTION
- △ : EMISSION CURRENT IN EMBODIMENT OF THE INVENTION

FLAT PANEL DISPLAY DEVICE UTILIZING ELECTRON EMISSION DEVICES

BACKGROUND OF THE INVENTION

1. Field of the Invention

The present invention relates to an electron emission device and a display apparatus using the same, especially to a flat panel display apparatus in which a plurality of the electron emission devices are arranged in an image display array, i.e. in a matrix arrangement.

2. Description of the Related Art

Conventionally, FEDs (field emission display devices) are known as flat type light-emitting display devices having an array of cool-cathode type electron emission sources whose cathodes are not required to be heated. It is necessary to unitize the flat type display device utilizing FEDs to develop an ultra-large display unit system for a next generation. Electron emitting devices as electron emission sources of FEDs include devices having a metal-insulator-semiconductor (MIS) structure and devices having a metal-insulator-metal (MIM) structure.

As shown in FIG. 1, an electron emission device having the MIS structure has a diode structure in which a top electrode 15 that is a metal thin-film electrode on the top is at a positive potential Vd and in which a bottom electrode 11 that is an ohmic electrode on a backside substrate 10 of glass is at a ground potential. When the voltage Vd is applied between the bottom electrode 11 and top electrode 15 to inject electrons into an electron supply layer 12, electrons move in an insulator layer 13 toward the top electrode 15. Since a diode current Id flows and the insulator layer 13 has a high resistance, a major part of the applied electric field acts on the insulator layer 13. Some of electrons that have approached the top electrode 15 pass through the top electrode 15 because of the presence of the strong electric field to be emitted into the external vacuum. Electrons "e" emitted by the top electrode 15 of the electron emission device (emission current Ie) are accelerated by a high acceleration voltage Vc applied to a collector electrode (transparent electrode) 2 provided on a front faceplate 1 in a face-to-face relationship with the same and are collected by the collector electrode 2. When the collector electrode is coated with a luminescent material 3, visible light associated with the element will be emitted.

In a matrix type flat panel display device formed in a matrix-like configuration in which top electrodes and bottom electrodes are orthogonal to each other respectively, a plurality of electron emission devices having the MIS (or MIM) structure are constructed by sequentially forming a bottom electrode, a semiconductor (or metal) electron supply layer, an insulator layer, and a top electrode on a substrate in each of regions where the top and bottom electrodes intersect each other. The top electrode is a very thin metal film to be formed as thin as possible to effectively draw out electrons from the insulator layer in view of mean free path of electrons, so that the top electrode tens is formed with a thickness of several or tens nano-meters. The thin top electrode is formed so as to straddle the precipice portions caused by the stack of the bottom electrode, the electron supply layer and the insulator layer. Thus the thickness of the top electrode at the precipice portion becomes thinner than that of the other portions. As a result, a high resistivity of the thin portion of the top electrode causes an uneven electric field to bring a drawback of destruction in the top electrode.

To overcome such a drawback, an MIM structure has been suggested in Japanese Patent Kokai No. Hei 11-120898, in which as shown in FIG. 2, the surface of the bottom electrode 11 other than the electron emitting section is covered with the insulating protective film and then the bus electrode is formed both on the insulating protective film and the backside substrate 10 in the manufacturing process.

However, the uneven electric field caused by the thin portion's high resistivity in the top electrode still appears with a risk of breakage of the bus electrode in the case that the thickness of the stacked layers, particularly, the insulator layer is very thick, since no insulating protective film is formed on the backside substrate between the adjacent electron emitting sections.

In addition, the bus electrode directly comes in to contact with the portion of the backside substrate 10 between the adjacent electron emitting sections because such a portion is temporally exposed. After that, in the sealing step of the front-side substrate and the backside substrate, the substrates for a panel to be sealed is kept under a high temperature condition for a long time period. In such a condition, alkaline components leak from the backside substrate of glass to react with the top electrode directly contacted and then migration and electrode corrosion occur in the top electrode.

Moreover, Japanese Patent Kokai No. Hei 11-185675 discloses an electron emission device based flat panel display apparatus. This apparatus includes electron emission devices constructed in such a manner that the bus electrode is kept in direct contact with the upper thin-film metal electrode, so that the portion of the bus electrode concentrate the electric field since the bus electrode has a low resistivity in comparison with the upper thin-film metal electrode. As a result, there is a problem that reduction of the electric field to be normally supplied to the electron emitting section of the upper thin-film metal electrode.

OBJECT AND SUMMARY OF THE INVENTION

The present invention has been conceived taking the above situation into consideration, and it is an object of the invention to provide a flat panel display device utilizing such electron emission sites capable of providing stable electron emission without deterioration.

The flat panel display device according to the invention comprises:

a backside and a front-side substrates facing each other with a vacuum space therebetween;

a plurality of electron emission sites provided on said backside substrate; each of said electron emission sites including
  a bottom electrode formed on a surface of said backside substrate proximate to said vacuum space,
  an insulator layer formed over said bottom electrode, and
  a top electrode formed on said insulator layer and arranged individually apart from each other and facing said vacuum space;

a plurality of bus electrodes for electrically connecting the neighboring top electrodes; and insulating protective films each provided between said bus electrode and said insulator layer and between said bus electrode and said backside substrate.

In one aspect of the flat panel display device according to the invention, each of said electron emission sites further comprises an electron supply layer made of a metal or semiconductor and formed on and between said bottom electrode and said insulator layer.

In another aspect of the flat panel display device according to the invention, the device further comprises second insulating protective films formed on said backside substrate between the neighboring electron emission sites.

In a further aspect of the flat panel display device according to the invention, the device further comprises at least one transparent collector electrode formed on a surface of said front-side substrate at the vacuum space side; and at least one luminescent layer formed on said collector electrode.

In a still further aspect of the flat panel display device according to the invention, the device further comprises at least one luminescent layer formed on a surface of said front-side substrate at the vacuum space side; and at least one collector electrode formed on said luminescent layer.

In another aspect of the flat panel display device according to the invention, said electron emission sites are arranged in an image display array corresponding to the luminescent layer.

In a further aspect of the flat panel display device according to the invention, said electron emission sites arranged in the image display array are defined and partitioned by at least matrix layer or stripe layer in a dark color or black.

In a still further aspect of the flat panel display device according to the invention, the bus electrodes and the bottom electrodes have a stripe shape respectively and are disposed perpendicular to each other.

DETAILED DESCRIPTION OF THE PREFERRED EMBODIMENTS

A flat panel display device according to an embodiment of the invention will now be described with reference to the accompanying drawings.

Figure 1:
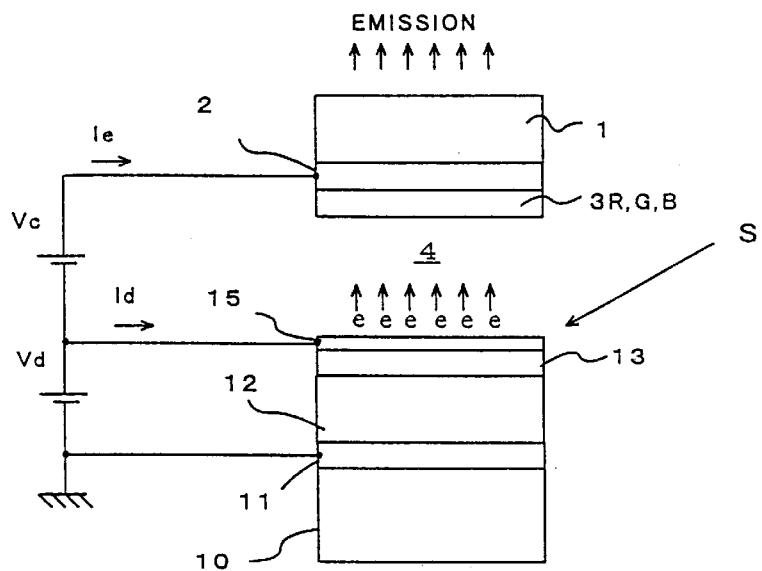
FIG. 1 is a schematic sectional view for explaining an electron emission device.
Figure 2:
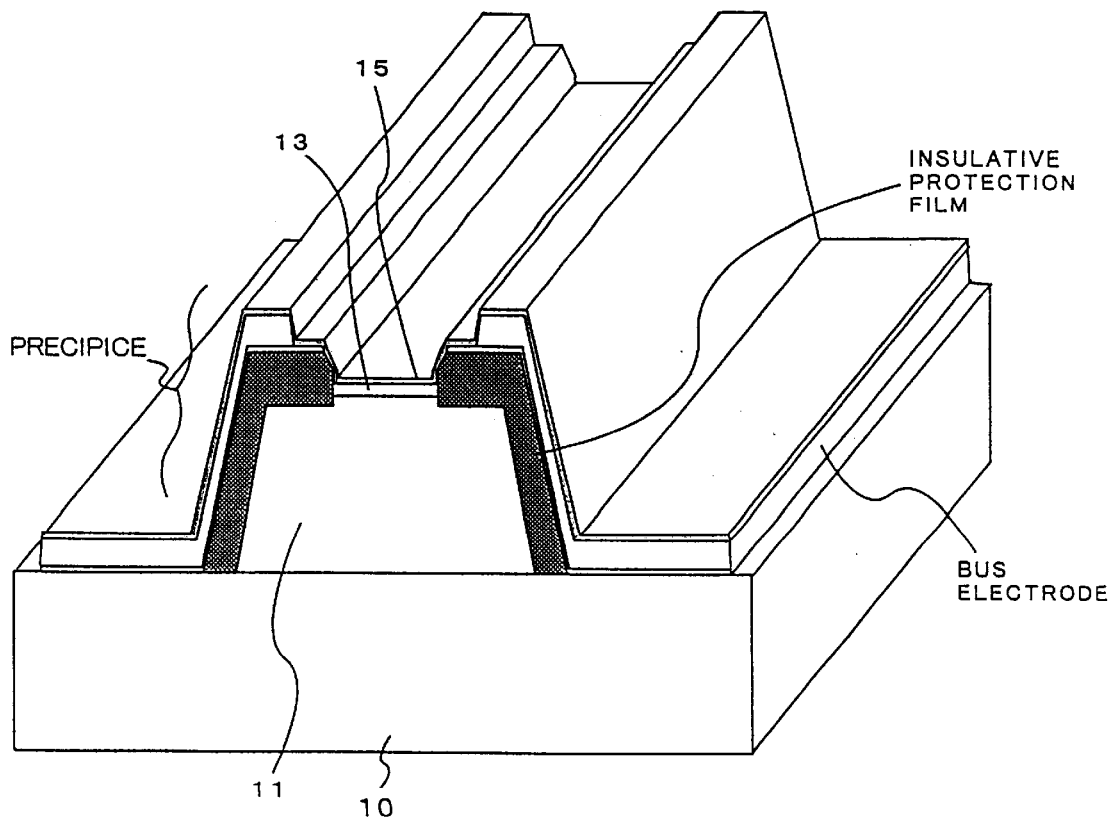
FIG. 2 is an enlarged schematic perspective view of an electron emission device.
Figure 3:
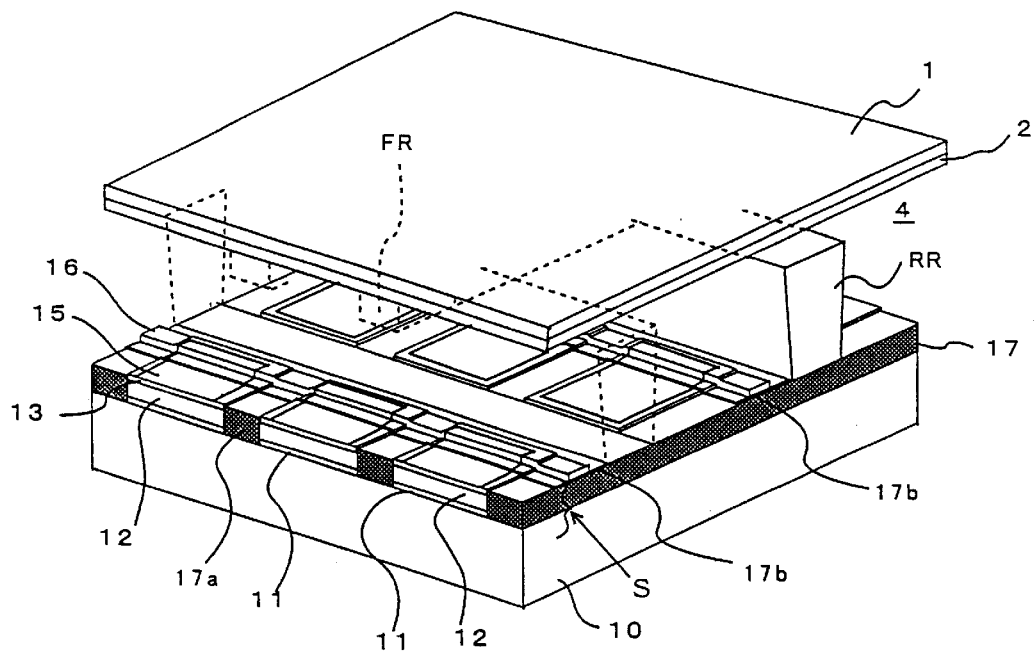
FIG. 3 is a schematic perspective view showing a part of a flat panel display device utilizing electron emission devices according to the invention.

As shown in FIG. 3, a flat panel display device utilizing electron emission devices or sites according to an embodiment of the invention has a pair of a backside substrate 10 and a transparent front-side substrate 1 which face each other with a vacuum space sandwiched therebetween. A plurality of electron emission sites S are arranged on the surface of the backside substrate 10 at the vacuum space side. Each of the electron emission sites S comprises an electron-supply layer 12, an insulator layer 13 and a thin-film metal electrode 15 which are layered in turn on a bottom electrode 11. The electron emission sites S are arranged on the backside substrate 10 so that the top electrodes 15 facing the vacuum space are disposed in a matrix array form.

A transparent collector electrode 2 of, for example, an indium tin oxide (so-called ITO), tin oxide (SnO), zinc oxide (ZnO) or the like, is formed on the inner surface of the front-side substrate 1 to trap electrons emitted from the electron emission sites S. Fluorescent substances 3 of red (R), green (G) and blue (B) emissions are coated on the transparent collector electrode 2.

In this way, the electron emission site-based flat panel display apparatus according to the invention comprises a pair of the front-side substrate 1 and the backside substrate 10 with electron emission sites S facing each other. These substrates 1 and 10 with the vacuum space 4 interposed therebetween are supported apart from one another in parallel by a spacer and sealed.

Figure 4:
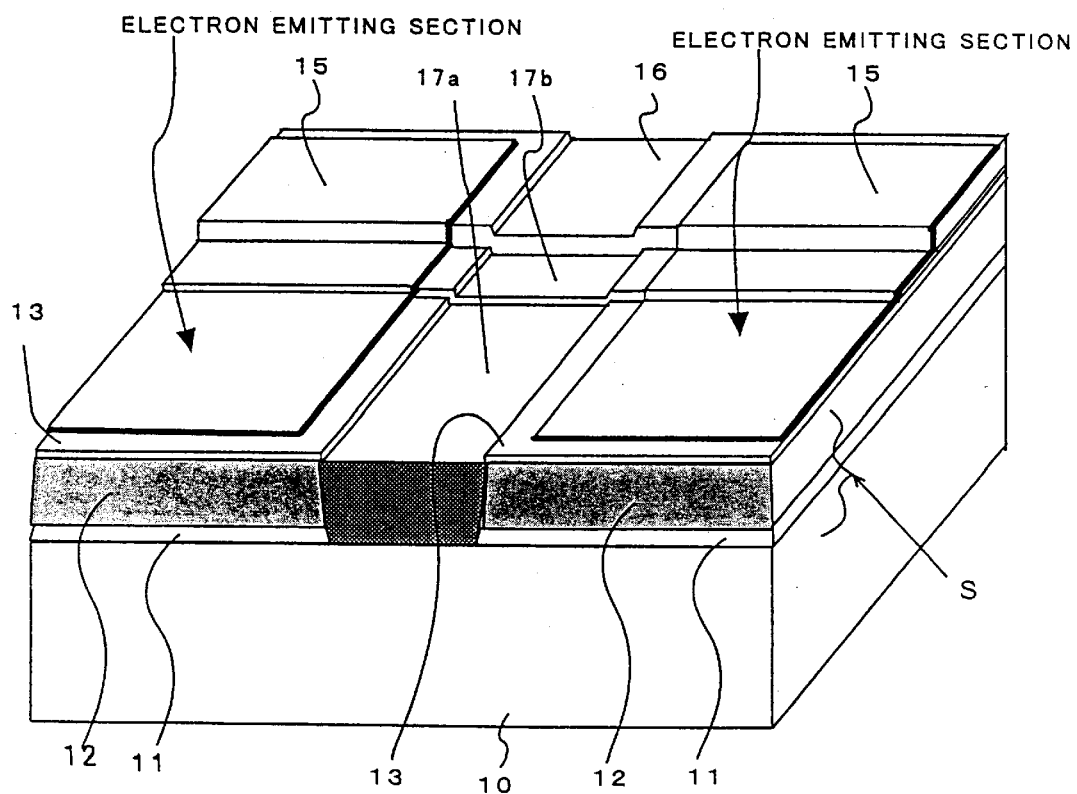
FIGS. 4 through 10 are schematic plan views each showing a part of a substrate at steps of manufacturing a flat panel display device utilizing electron emission devices according to an embodiment of the invention.

As shown in FIG. 3, the electron emission site based flat panel display apparatus further includes plural bus electrodes 16 for connecting the adjacent top electrodes 15 arranged individually apart from each other. As shown in FIG. 4, the bus electrodes 16 are formed on second insulating protective films 17b corresponding thereto respectively. The insulating protective films includes first insulating protective films 17a each disposed between the bus electrodes 16 and the backside substrate 10, and the second insulating protective films 17b each disposed between the bus electrodes 16 and the insulator layer 13. The first and second insulating protective films 17a and 17b are disposed perpendicular to each other.

As illustrated in FIG. 4, the top electrodes 15 formed on the insulator layer 13 are formed only in flat regions of the insulator layer at spaces associated with sub-pixels. The top electrodes 15 are formed on the flat surfaces of the insulator layer 13 with a uniform thickness without shaping the top electrodes themselves in the form of stripes. This makes it possible to generate a uniform electric field when they are driven. The connecting section (precipice portion) of each top electrode 15 is formed on the bus electrode 16 which is sufficiently thick. The top electrodes 15 of adjoining devices are connected by the bus electrode 16. While a bus electrode 16 is formed to cross a precipice portion that is formed because of the thickness of a bottom electrode, a semiconductor electron supply layer, and an insulator layer, since a sufficiently thick first insulating protective film 17a is provided under the bus electrode 16, any shorting between the electrode and the bottom electrode 11 or semiconductor electron supply layer 12 is prevented. The thickness of the bus electrodes 16 relative to the panel size may be any value as long as no problem associated with resistance occurs, a preferable thickness ranging from 0.1 to 50 $\mu$m. The first insulating protective film 17a under the bus electrodes 16 may be provided before or after the insulator layer 13 at the pixel region is formed. The insulating protective films 17a make it possible to provide a device structure in which the bus electrodes 16 are not damaged because of the presence of the precipice.

While layers of Cr, Cu and Cr are used as materials for the bus electrodes, it is not limited to use such materials, and any metal such as Pt, Au, W, Ru, Ir, Al, Sc, Ti, V, Mn, Fe, Co, Ni, Zn, Ga, Y, Zr, Nb, Mo, Tc, Rh, Pd, Ag, Cd, Ln, Sn, Ta, Re, Os, Tl, Pb, La, Ce, Pr, Nd, Pm, Sm, Eu, Gd, Tb, Dy, Ho, Er, Tm, Yb or Lu may be used alone. Alternatively, or any compound or layers of such metals may be used.

It is not limited to form the bus electrodes such that they contact one end of the top electrodes 15 (pixel region) as illustrated, and they may be formed to surround the top electrodes 15. The second insulating protective films under the bus electrodes 16 may be also formed to surround the top electrodes 15.

Silicon oxide $SiO_x$ (wherein subscripted x represents an atomic ratio) is effective as the dielectric material of the first and second insulating protective films 17a and 17b and, metal oxides or metal nitrides such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $TiN_x$, $ZrO_x$, $ZrN_x$, $HfO_x$, $HfN_x$, $ThO_x$, $VO_x$, $VN_x$, $NbO_x$, $NbN_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$ and the like can be used as well.

Furthermore, metal complex oxides such $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $Na_2SiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well, and still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$, CuI, $FeI_2$ and the like and metal oxidized nitrides such as SiAlON and the like can be used as well for dielectric material of the insulator layer 13.

Ceramics such as $Al_2O_3$, $Si_3N_4$ and BN an the like may be used for the material of the backside substrate 10 instead of glass. The layers of Cr, Cu and Cr are used as materials for the bottom electrode 11, it is not limited to use such materials, and any metal such as Pt, Au, W, Ru, Ir, Al, Sc, Ti, V, Mn, Fe, Co, Ni, Zn, Ga, Y, Zr, Nb, Mo, Tc, Rh, Pd, Ag, Cd, Ln, Sn, Ta, Re, Os, Tl, Pb, La, Ce, Pr, Nd, Pm, Sm, Eu, Gd, Tb, Dy, Ho, Er, Tm, Yb or Lu may be used alone. Alternatively, or any compound or layers of such metals may be used. Metals Pt, Au, W, Ru and Ir are effective as the material for the top electrode 15 on the electron emission side. In addition, Al, Sc, Ti, V, Cr, Mn, Fe, Co, Ni, Cu, Zn, Ga, Y, Zr, Nb, Mo, Tc, Rh, Pd, Ag, Cd, Ln, Sn, Ta, Re, Os, Ti, Pb, La, Ce, Pr, Nd, Pm, Sm, Eu, Gd, Tb, Dy, Ho, Er, Tm, Yb, Lu and the like can be used as well for the thin-film top electrode 15.

Amorphous silicon (so-called a-Si) is an advantageous material for the electron supply layers 12 of the electron emission sites. Further particularly the hydrogenated amorphous silicon (so-called a-Si:H) in which almost of the dangling bonds of a-Si are terminated by hydrogen atoms is effective for the electron supply layers 12. In addition, hydrogenated amorphous silicon carbide (so-called a-SiC:H) in which parts of Si atoms are replaced by carbon atoms (C) is also effectively used for the electron-supply layer 12. Moreover hydrogenated amorphous silicon nitride (so-called a-SiN:H) in which parts of Si atoms are replaced by nitrogen atoms (N) may be also effectively used for the electron-supply layer 12. In addition, silicon doped with boron and/or antimony may be used for the electron-supply layer 12.

$SiO_x$ is used as a dielectric material for the insulator layer 13. Moreover, materials such as metal oxides or metal nitrides, metal complex oxides, sulfides, halides, or metal oxidized nitrides used for the dielectric material of the first and second insulating protective films 17a and 17b are effective for the insulator layer 13. Still further, carbon such as diamond, Fullerene ($C_{2n}$), carbon nano-tube and the like or metal carbide such as $Al_4C_3$, $B_4C$, $CaC_2$, $Cr_3C_2$, $Mo_2C$, MoC, NbC, SiC, TaC, TiC, VC, $W_2C$, WC, ZrC and the like are also effective as the dielectric material of the insulator layer 13. Fullerene ($C_{2n}$) consists of carbon atoms. The representative $C_{60}$ is a spherical surface basket molecule as known a soccer ball molecule. There is also known $C_{32}$ to $C_{960}$ and the like. The subscribed x in $O_x$, $N_x$, and the like in the above chemical formulas represent atomic ratios and also herein after. The film thickness of the insulator layer 13 may be 50 nm or greater preferably in ranging from 100 to 1000 nm.

Although sputtering is particularly effective in the fabrication of those layers and the substrate, vacuum deposition, CVD (Chemical Vapor Deposition), laser ablation, MBE (Molecular Beam Epitaxy) and ion beam sputtering are also effective.

Steps of manufacturing a flat panel display device utilizing electron emission sites will now be described.

Figure 5:
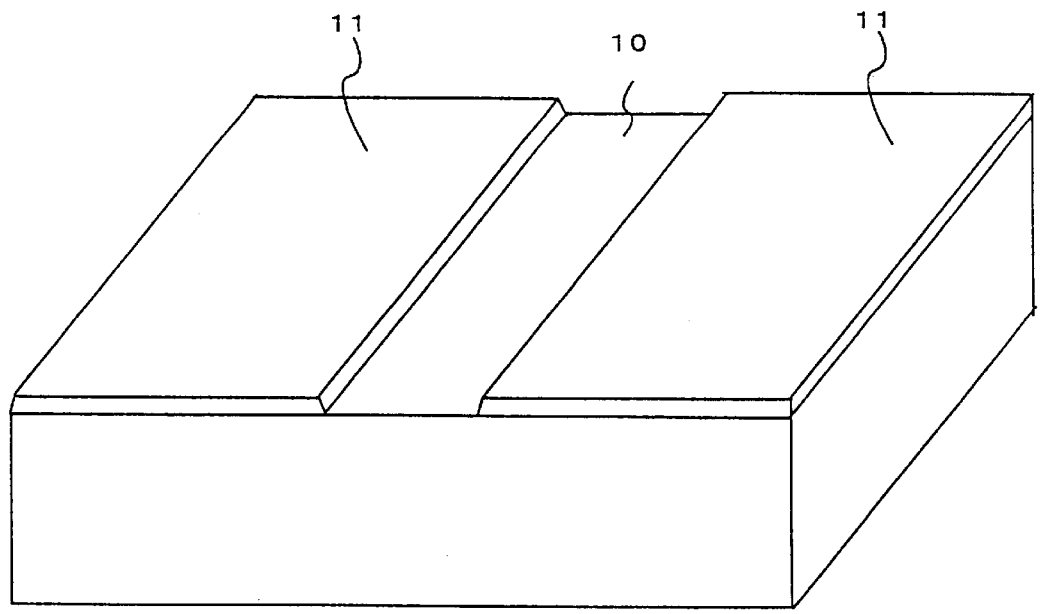

As shown in FIG. 5, a plurality of bottom electrodes 11 in the form of stripes are formed in parallel on a glass substrate 10 which has been cleaned. Referring to the method of forming the electrodes, they may be formed only in bottom electrode forming regions using a mask, for example. Alternatively, a method may be employed in which an electrode film is formed on the entire surface of a substrate and in which the film is then etched in various ways using a mask to leave only bottom electrode regions.

Figure 6:
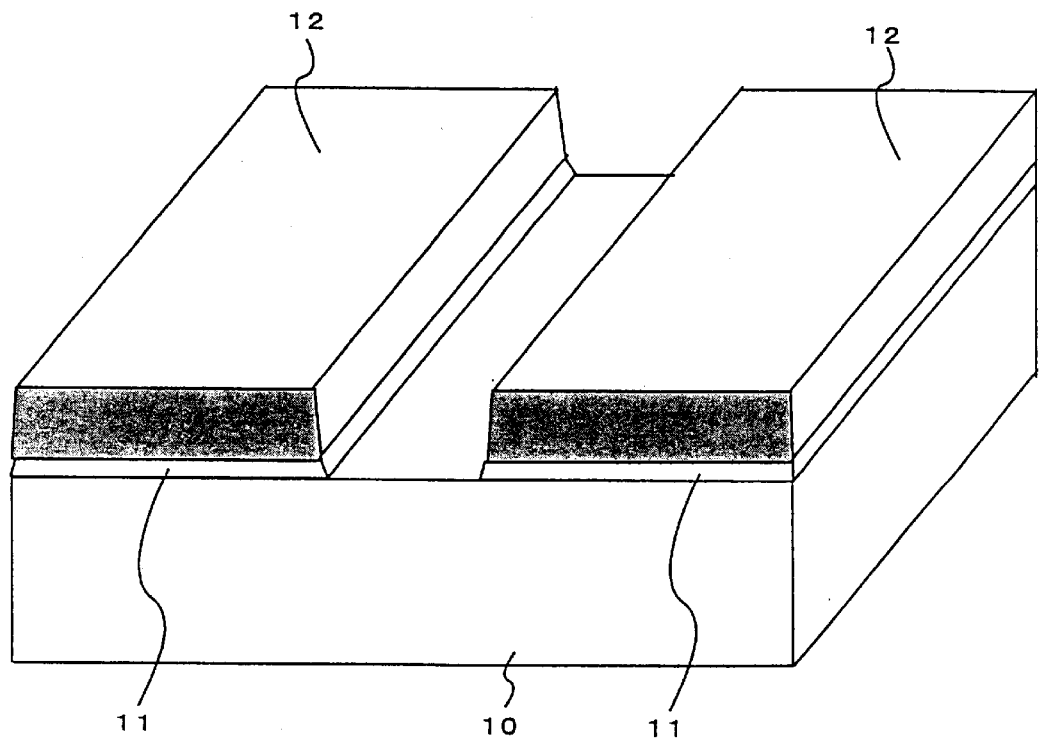

Next, as shown in FIG. 6, an electron supply layer 12 is formed through etching on each of the bottom electrode surface 11 thus fabricated such that it extends along the bottom electrode 11 except a region of the same which is to serve as pickup section or a first external repeating terminal 18 later.

Figure 7:
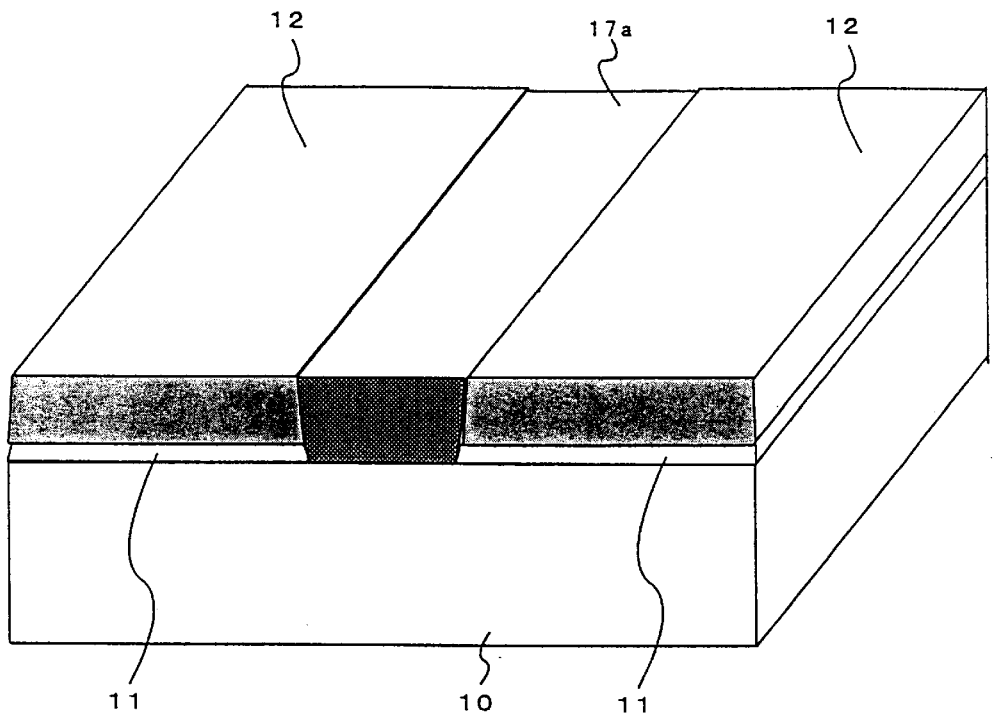

Next, as shown in FIG. 7, first insulating protective films 17a are formed on precipice portions defined between the electron supply layers 12 in the form of stripes as a result of the formation of the bottom electrodes 11 and electron supply layers 12 and on the substrate 10 at the bottom of the same. The entire surface of the substrate 10 is covered by the first insulating protective films 17a. The thickness of the first insulating protective films 17a may be set at a value that is similar to or greater than the thickness up to the electron supply layer 12.

In this panel, the bus electrodes 16 which are arranged in parallel in the direction orthogonal to the direction of the bottom electrodes 11 must be formed at a later step. The breakage of the bus electrodes 16 located on the top of the panel attributable to the difference between the thicknesses of the bottom electrodes 11 and electron supply layers 12 is prevented by providing the first insulating protective films 17a.

Figure 8:
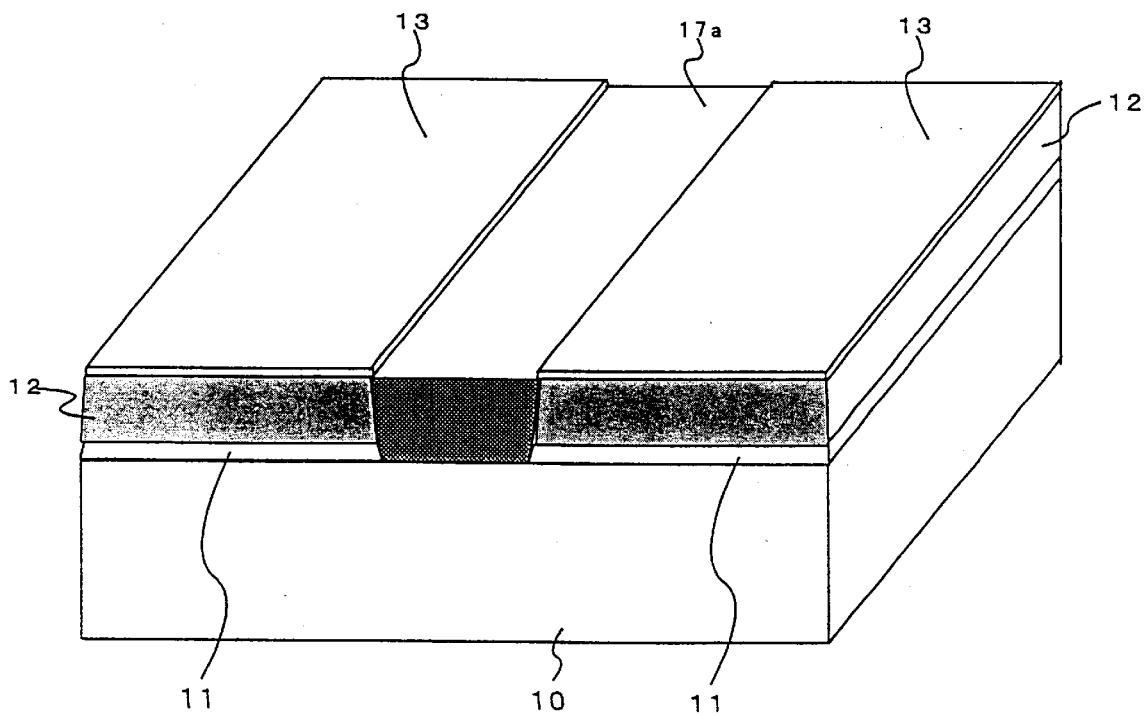

Next, as shown in FIG. 8, etching is performed to form the insulator layer 13 on each of the electron supply layer 12 such that it is defined along the electron supply layer.

Figure 9:
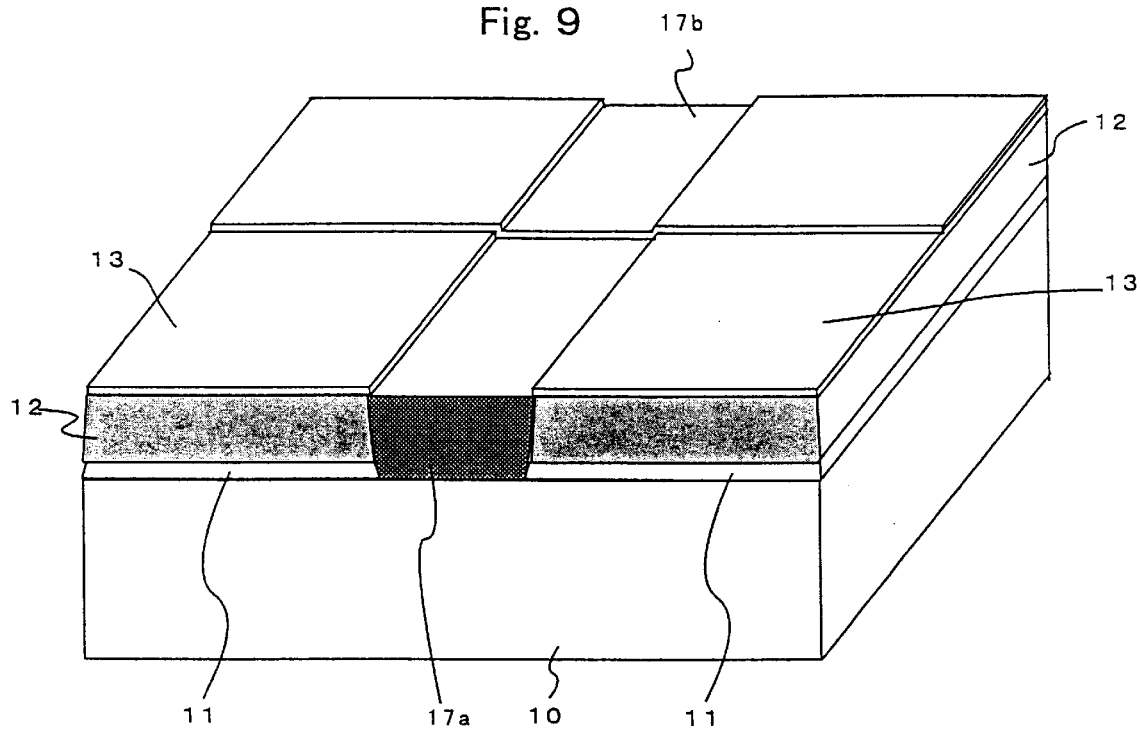

Next, as shown in FIG. 9, the second insulating protective films 17b for the bus electrodes to be formed at a later step are formed on the first insulating protective films 17a and the insulator layer 13 such that they extend in the direction orthogonal to the bottom electrodes. The insulator layer 13 is exposed between the second insulating protective films 17b to define electron emitting sections.

Figure 10:
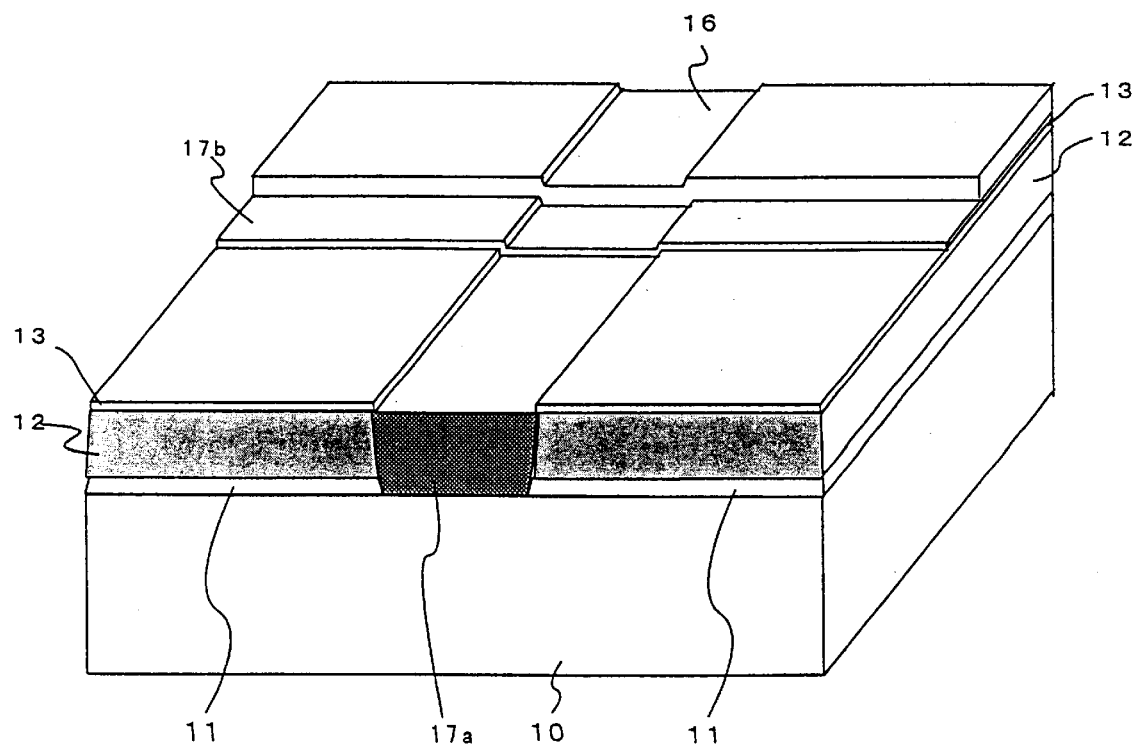

Next, as shown in FIG. 10, the bus electrodes 16 having a predetermined thickness are formed only on the second insulating protective films 17b such that they are defined along the same.

Next, as shown in FIG. 4, the top electrodes 15 are formed as individual electrodes in the form of islands to be linked by the bus electrodes 16. Each of the top electrodes 15 is formed across the bus electrodes 16, second insulating protective films 17b, and insulator layer 13 such that a major part of the same is located on a flat surface of the insulator layer 13 and such that an edge of the same covers a part of a bus electrode 16. The first insulating protective films 17a isolate the bus electrodes 16 and isolate adjoining devices from each other, and the second insulating protective films 17b isolate the bus electrodes 16 from the insulator layer 13. Since the distance from the electron supply layer 12 to the top electrode 15 in a region where the second insulating protective film 17b is formed is greater than a similar distance in a region where no second insulating protective film 17b is formed, it is possible to prevent a leak current from the bottom of the bus electrodes 16 and the bottom of the top electrodes 15 on the way to the emitting section.

Namely, according to the invention, the insulating protective film formed immediately under the bus electrode insulates the bus electrode 16 and the insulator layer 13 from each other to uniformly supply the electric field only a portion under the top electrode 15, although the foregoing display apparatus disclosed by Japanese Patent Kokai No. Hei 11-185675 constructed in such a manner that the bus electrode is kept in direct contact with the upper thin-film metal electrode so that the portion of the bus electrode concentrate the electric field to reduce the electric field to be normally supplied to the electron emitting section of the upper thin-film metal electrode.

The front-side substrate is fabricated by forming the transparent collector electrodes 2 on the transparent front-side substrate 1 made of glass or the like. While any material exhibiting high transmittance against visible light and a low electrical resistance may be used as the transparent collector electrodes 2, in particular, ITO is the optimum material. The transparent collector electrodes 2 are formed on the entire surface of the front-side substrate to a thickness of 0.4 $\mu$m.

Referring now to a combining step, the backside substrate and front-side substrate thus fabricated are combined such that a partition wall (not shown) on the backside substrate 10 and a second partition wall (not shown) on the front-side substrate 1 are in contact with each other and such that the two substrates face each other with the vacuum space 4 sandwiched therebetween; the substrates are sealed at the periphery thereof; evacuation is carried out between the two substrates; and a getter provided therein is thereafter scattered through induction heating; and the exhaust port is finally sealed.

The bottom electrodes and bus electrodes on the backside substrate are respectively connected to the ground and a positive voltage, and the transparent electrodes on the front-side substrate are connected to a positive voltage of a few kV, to complete a flat panel display device consisting of a pair of a transparent front-side substrate 1 and a backside substrate 10 as shown in FIG. 3.

(Another Embodiment)

Figure 11:
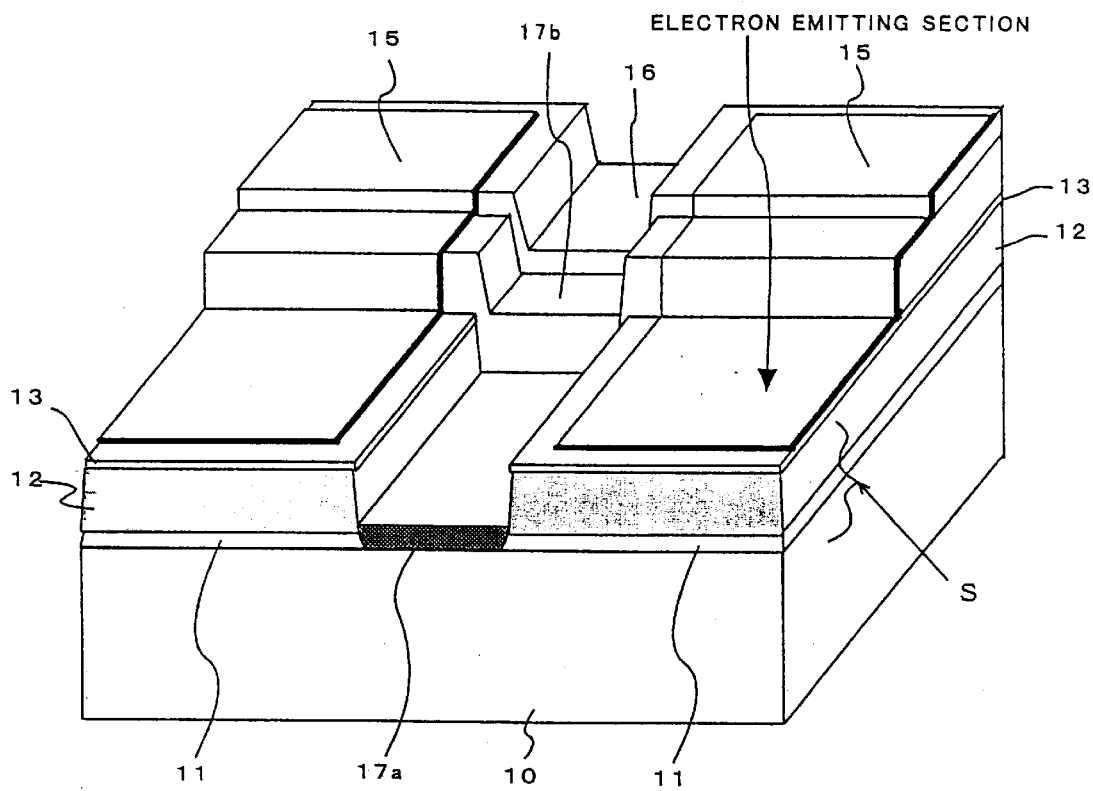
FIGS. 11 and 12 are schematic plan views each showing a part of a substrate at steps of manufacturing a flat panel display device utilizing electron emission devices according to other embodiments of the invention.
Figure 12:
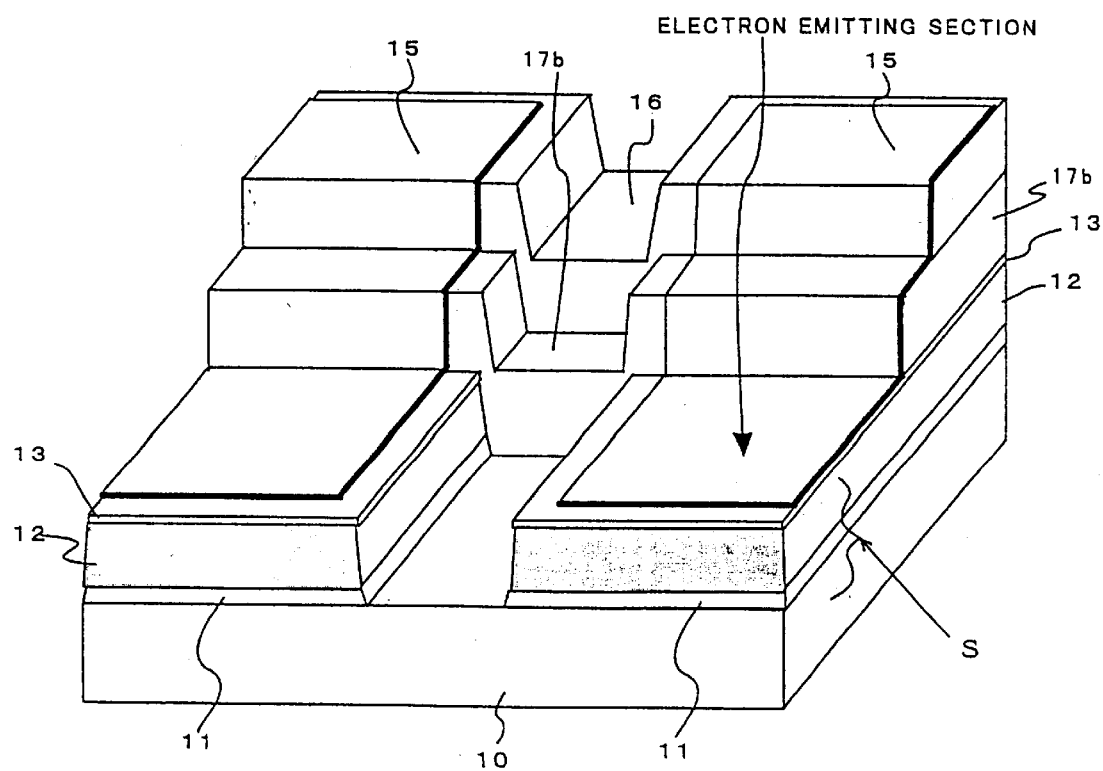

The thickness of the first insulating protective films 17a in the above-described embodiment may be set at a value that is similar to or greater than the thickness up to the electron supply layer 12 as shown in FIG. 7, this is not limiting the present invention. For example, breakage of the bus electrodes can be avoided if the films have a thickness that is 5% or more of the thickness of the electron emission sites as shown in FIG. 11. Therefore, the thickness of the first insulating protective films is preferably 5% or more of the thickness of the devices as a whole (about 6 $\mu$m) (the upper liming being a thickness that is substantially equal to the height of the device insulator layer 13). The lower limit for the thickness of the first insulating protective films 17a is a thickness which does not cause breakage of the bus electrodes. Further, as shown in FIG. 12, even if there is no first insulating protective film, each of second insulating protective films 17b having a thickness ranging from 5% or more of the total thickness of the device to 5 $\mu$m avoids the breaking of the bus electrode as well as the top electrode as an advantageous effect of the invention. The second insulating protective films 17b facilitates to improve the freedom of design for the display panel without line breakage.

Figure 13:
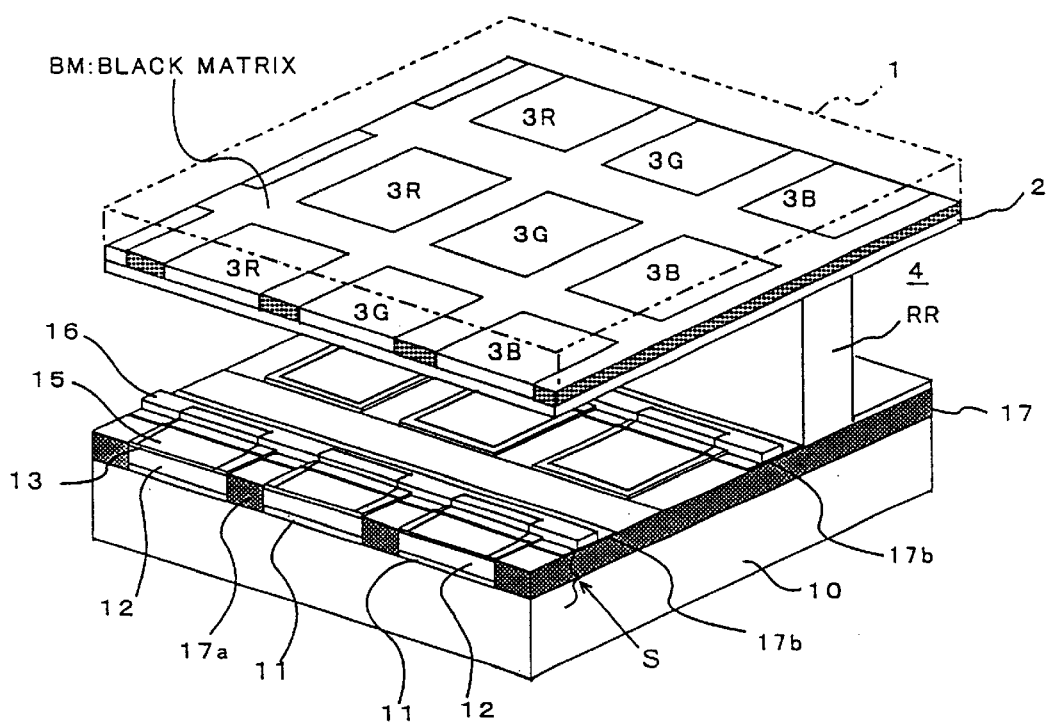
FIG. 13 is a schematic perspective view showing a part of a flat panel display device utilizing electron emission devices according to another embodiment of the invention.

While the transparent collector electrodes 2 made of ITO or the like are directly formed on the transparent front-side substrate 1 made of glass or the like in the above-described embodiment as shown in FIG. 3, this is not limiting the invention. For example, according to a still another embodiment of the invention, luminescent material layers 3R, 3G, and 3B respectively emitting red, green, and blue light may be provided in regions defined by a black matrix BM made of carbon or the like on an inner surface of a front-side substrate 1, and conductor layers made of Al or the like may be provided on the inner surface to be used as collector electrodes 2 as shown in FIG. 13. While an image display array constituted by a plurality of light-emitting sections associated with the luminescent material layers 3R, 3G, and 3B is defined by the matrix layer BM in a dark color or black, they may be similarly defined using a stripe layer in a dark color or black. In either case, there is provided a flat panel display device utilizing electron emission sites having an image display array constituted by a plurality of light-emitting sections associated with the luminescent material layers.

SPECIFIC EXAMPLE

A flat panel display device was actually fabricated with specifications (1) through (6) as shown below, and then characteristics of the same were examined.

(1) Bottom electrodes: Cr, Cu, and Cr films having thicknesses of 50 nm, 1 $\mu$m, and 100 nm, respectively.

(2) Semiconductor electron supply layer: Si layer having a thickness of 4 $\mu$m.

(3) Insulator layer: $SiO_x$ layer having a thickness of 330 nm.

(4) Top electrode: Pt film having a thickness of 40 nm.

(5) Bus electrodes: Cr, Cu, and Cr films having thicknesses of 50 nm, 1 $\mu$m, and 100 nm, respectively.

(6) Insulating protective films to be under the bus electrode: $SiO_x$ films having a thickness of 350 nm.

The bottom electrodes (1) and semiconductor electron supply layers (2) were formed in the form of lines on a glass substrate which had been cleaned. Thereafter, the first insulating protective films to be under the bus electrode (6) were formed between the lines. Next, the insulator layers (3) were formed on the semiconductor electron supply layers (2) in the form of lines such that they are defined along the same. Next, the second insulating protective films to be under the bus electrode (6) were formed on the first insulating protective films to be under the bus electrode (6) and the insulator layers (3) in the form of line orthogonal thereto. Next, the bus electrodes (5) were formed on the second insulating protective films to be under the bus electrode (6) orthogonal to the bottom electrodes (1) such that they were defined along the same. After that, the top electrode (4) was formed for each of the light-emitting sections such that it covers a flat region of the semiconductor electron supply layer (2) and a part of the bus electrode (5). The sputtering process is used for those film formations. The glass (backside) substrate formed with an emission site comprised of a plurality of electron emission sites and a separately fabricated front-side substrate applied with luminescent materials serving as pixels capable of emitting R, G, and B light were disposed such that they sandwich spacers made of glass. They are heated and bonded together in a high level of vacuum of $1 \times 10^{-7}$ torr to form a panel. A high level of vacuum was maintained inside the panel using a non-evaporating getter.

A voltage of 5 kV as an acceleration voltage was applied to the flat panel display device thus fabricated, and electrical characteristics, i.e., a driving voltage, a device current, and an emission current were examined.

Figure 14:
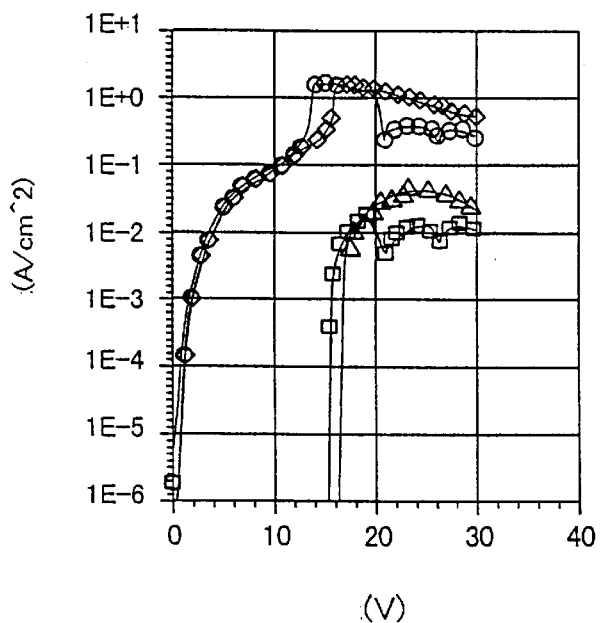
FIG. 14 is a graph showing electrical characteristics, i.e., a driving voltage, a device current, and an emission current of a flat panel display device utilizing electron emission devices according to an embodiment of the invention.

As a result of the evaluation of the electrical characteristics, it was confirmed that the fluctuation of current in the device caused by electrode destruction is reduced to obtain a stable device current and emission current, as shown in FIG. 14, in comparison with those of characteristics of the conventional apparatus in which the top electrodes straddle the precipice portions the precipice portion of the devices.

As described above, according to the invention, the top electrode is formed only on the flat surface of the insulator layer in the electron emission site and then, the insulating protective film is formed immediately under the bus electrode. Therefore, the insulating protective film insulates the bus electrode and the insulator layer from each other so as to uniformly supply the electric field only a portion under the top electrode and to avoid weakening the electric field at the electron emitting section of the top electrode. Further, the electrode destruction caused by the precipice portions between the devices is effectively prevented since the connection between the top electrodes is achieved with only a very thick bus electrode. Moreover, the insulating protective film is also continuously provided under the bus electrode between the adjacent electron emitting sections, particularly the precipices. Therefore, the insulating protective film formed immediately under the bus electrode insulates the bus electrode 16 and the insulator layer 13 from each other to prevent migration and corrosion caused by the leakage of alkaline components from the substrate during the sealing step of the panel.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2000-401723 which is hereby incorporated by reference.

What is claimed is:

1. A device comprising:
    a backside and a front-side substrates facing each other with a vacuum space therebetween;
    a plurality of electron emission sites provided on said backside substrate;
    each of said electron emission sites including
        a bottom electrode formed on a surface of said backside substrate proximate to said vacuum space,
        an insulator layer formed over said bottom electrode, and
        a top electrode formed on said insulator layer and arranged individually apart from each other and facing said vacuum space;
    a plurality of bus electrodes for electrically connecting the neighboring top electrodes; and
    insulating protective films each provided between said bus electrodes and said insulator layer,
    wherein the bus electrodes are formed on the insulating protective films.

2. A display device according to claim 1, wherein each of said electron emission sites further comprises an electron supply layer made of a metal or semiconductor and formed on and between said bottom electrode and said insulator layer.

3. A display device according to claim 1, further comprising second insulating protective films formed on said backside substrate between the neighboring electron emission sites.

4. A display device according to claim 1, further comprising at least one transparent collector electrode formed on a surface of said front-side substrate at the vacuum space side; and at least one luminescent layer formed on said collector electrode.

5. A display device according to claim 1, further comprising at least one luminescent layer formed on a surface of said front-side substrate at the vacuum space side; and at least one collector electrode formed on said luminescent layer.

6. A display device according to claim 4, wherein said electron emission sites are arranged in an image display array corresponding to the luminescent layer.

7. A display device according to claim 4, wherein said electron emission sites arranged in the image display array are defined and partitioned by at least matrix layer or stripe layer in a dark color or black.

8. A display device according to claim 1, wherein the bus electrodes and the bottom electrodes have a stripe shape respectively and are disposed perpendicular to each other.

9. A display device comprising:
    a backside and a front-side substrates facing each other with a vacuum space therebetween;
    a plurality of electron emission sites provided on said backside substrate; each of said electron emission sites including
        a bottom electrode formed on a surface of said backside substrate proximate to said vacuum space,
        an insulator layer formed over said bottom electrode, and
        a top electrode formed on said insulator layer and arranged individually apart from each other and facing said vacuum space;

a plurality of bus electrodes for electrically connecting the neighboring top electrodes;

first insulating protective films each provided between said bus electrodes and said insulator layer; and second insulating protective films each provided between said backside substrate and said bus electrodes.

* * * * *